(12) United States Patent
Bush et al.

(10) Patent No.: US 10,178,546 B2
(45) Date of Patent: *Jan. 8, 2019

(54) MOBILE DEVICE ACTIVATION

(71) Applicant: Apple Inc., Cupertino, CA (US)

(72) Inventors: Jeffrey Bush, San Jose, CA (US); Scott Forstall, Mountain View, CA (US); Jeffrey L. Robbin, Los Altos, CA (US); Eddy Cue, Los Altos, CA (US); Dallas De Atley, San Francisco, CA (US); Steve Jobs, Palo Alto, CA (US); Patrice Gautier, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,968

(22) Filed: Sep. 15, 2014

(65) Prior Publication Data

US 2015/0004959 A1 Jan. 1, 2015

Related U.S. Application Data

(63) Continuation of application No. 11/650,859, filed on Jan. 7, 2007, now Pat. No. 8,849,278.

(51) Int. Cl.
*H04W 4/00* (2018.01)
*H04M 1/66* (2006.01)
(Continued)

(52) U.S. Cl.
CPC .............. *H04W 8/22* (2013.01); *H04W 4/00* (2013.01); *H04W 4/02* (2013.01); *H04W 4/50* (2018.02);
(Continued)

(58) Field of Classification Search
CPC ....... H04W 4/00–4/021; H04W 4/024; H04W 4/025; H04W 4/029; H04W 4/24; H04W 4/30; H04W 4/50–4/80
See application file for complete search history.

(56) References Cited

U.S. PATENT DOCUMENTS

| 3,876,942 A | 4/1975 | Koster et al. |
| 5,386,455 A | 1/1995 | Cooper et al. |

(Continued)

FOREIGN PATENT DOCUMENTS

| DE | 19823074 A1 | 11/1999 |
| EP | 367361 A2 | 5/1990 |

(Continued)

OTHER PUBLICATIONS

European Patent Application No. 11151761.1—Office Action dated Apr. 22, 2014.
(Continued)

*Primary Examiner* — San Htun
(74) *Attorney, Agent, or Firm* — Dickinson Wright RLLP (57) ABSTRACT

Methods, systems and apparatus that facilitate activation of mobile devices, such as communication devices or multi-function devices, via a computer are disclosed. According to one aspect of the invention, a mobile device can be forced into a limited service mode until properly activated with a service provider for a wireless network. According to another aspect of the invention, a mobile device can defer its attempt to send a location update request to a wireless network. According to still another aspect of the invention, a mobile device can be automatically controlled to reset a portion of its internal hardware to initiate a location update request.

20 Claims, 9 Drawing Sheets

(51) Int. Cl.
| | |
|---|---|
| *H04W 8/22* | (2009.01) |
| *H04W 8/26* | (2009.01) |
| *H04W 4/02* | (2018.01) |
| *H04W 60/00* | (2009.01) |
| *H04W 4/50* | (2018.01) |
| *H04W 8/04* | (2009.01) |
| *H04W 60/04* | (2009.01) |

(52) U.S. Cl.
CPC ........... *H04W 8/265* (2013.01); *H04W 60/00* (2013.01); *H04W 8/04* (2013.01); *H04W 60/04* (2013.01)

(56) References Cited

U.S. PATENT DOCUMENTS

| | | | |
|---|---|---|---|
| 5,444,764 A | 8/1995 | Galecki | |
| 5,835,061 A | 11/1998 | Stewart | |
| 6,119,003 A * | 9/2000 | Kukkohovi | H04W 48/18 455/434 |
| 6,119,020 A * | 9/2000 | Miller | H04B 1/3816 455/410 |
| 6,124,799 A | 9/2000 | Parker | |
| 6,134,435 A | 10/2000 | Zicker et al. | |
| 6,137,783 A | 10/2000 | Sallberg et al. | |
| 6,185,427 B1 | 2/2001 | Krasner et al. | |
| 6,199,045 B1 | 3/2001 | Giniger et al. | |
| 6,259,405 B1 | 7/2001 | Stewart et al. | |
| 6,263,214 B1 * | 7/2001 | Yazaki | H04W 8/183 455/410 |
| 6,298,291 B1 | 10/2001 | Davis, Jr. et al. | |
| 6,323,846 B1 | 11/2001 | Westerman et al. | |
| 6,349,199 B1 * | 2/2002 | Armantrout | H04W 24/00 455/67.11 |
| 6,456,234 B1 | 9/2002 | Johnson | |
| 6,487,403 B2 | 11/2002 | Carroll | |
| 6,570,557 B1 | 5/2003 | Westerman et al. | |
| 6,611,687 B1 | 8/2003 | Clark et al. | |
| 6,615,213 B1 | 9/2003 | Johnson | |
| 6,621,079 B1 | 9/2003 | Shao et al. | |
| 6,628,934 B2 * | 9/2003 | Rosenberg | G06Q 20/14 455/406 |
| 6,677,932 B1 | 1/2004 | Westerman | |
| 6,731,238 B2 | 5/2004 | Johnson | |
| 6,878,825 B2 | 4/2005 | Krieger et al. | |
| 6,888,536 B2 | 5/2005 | Westerman et al. | |
| 6,961,567 B1 * | 11/2005 | Kuhn | H04W 8/04 379/121.06 |
| 7,054,642 B1 | 5/2006 | Matz et al. | |
| 7,187,997 B2 | 3/2007 | Johnson | |
| 7,359,516 B1 | 4/2008 | Skinner et al. | |
| 8,141,136 B2 * | 3/2012 | Lee | G06Q 20/3552 380/277 |
| 8,849,278 B2 | 9/2014 | Bush et al. | |
| 8,855,617 B2 | 10/2014 | Gautier et al. | |
| 8,966,383 B2 | 2/2015 | Gautier et al. | |
| 2001/0030235 A1 | 10/2001 | Hedemann et al. | |
| 2002/0037724 A1 | 3/2002 | Chatterjee et al. | |
| 2002/0082048 A1 | 6/2002 | Toyoshima | |
| 2002/0085530 A1 | 7/2002 | Toyoshima | |
| 2002/0154632 A1 * | 10/2002 | Wang | H04W 48/18 370/389 |
| 2002/0197992 A1 | 12/2002 | Nizri et al. | |
| 2003/0021413 A1 | 1/2003 | Kiiveri et al. | |
| 2003/0083068 A1 | 5/2003 | Wong | |
| 2003/0119515 A1 | 6/2003 | Holler et al. | |
| 2004/0092248 A1 | 5/2004 | Kelkar et al. | |
| 2004/0102183 A1 | 5/2004 | Haub et al. | |
| 2004/0121802 A1 | 6/2004 | Kim et al. | |
| 2004/0137890 A1 | 7/2004 | Kalke | |
| 2004/0142725 A1 | 7/2004 | Kim | |
| 2004/0176133 A1 | 9/2004 | Lipsit | |
| 2004/0200895 A1 | 10/2004 | Boyce et al. | |
| 2004/0235458 A1 | 11/2004 | Walden et al. | |
| 2004/0242209 A1 | 12/2004 | Kruis et al. | |
| 2004/0242224 A1 | 12/2004 | Janik et al. | |
| 2005/0079863 A1 | 4/2005 | Macaluso | |
| 2005/0120209 A1 | 6/2005 | Kwon et al. | |
| 2005/0141438 A1 | 6/2005 | Quetglas et al. | |
| 2006/0046717 A1 | 3/2006 | Bovell et al. | |
| 2006/0063546 A1 | 3/2006 | Fischer | |
| 2006/0079284 A1 | 4/2006 | Lu et al. | |
| 2006/0095339 A1 | 5/2006 | Hayashi et al. | |
| 2006/0105810 A1 | 5/2006 | Gnuschke | |
| 2006/0143098 A1 | 6/2006 | Lazaridis | |
| 2006/0154647 A1 | 7/2006 | Choi | |
| 2006/0160569 A1 | 7/2006 | Chen et al. | |
| 2006/0183500 A1 | 8/2006 | Choi | |
| 2007/0050622 A1 | 3/2007 | Rager et al. | |
| 2007/0082655 A1 | 4/2007 | Link et al. | |
| 2007/0094737 A1 | 4/2007 | Larsson et al. | |
| 2007/0129057 A1 * | 6/2007 | Xu | H04W 12/08 455/410 |
| 2007/0167161 A1 | 7/2007 | Cheng et al. | |
| 2007/0264983 A1 | 11/2007 | Chen et al. | |
| 2008/0003980 A1 | 1/2008 | Voss et al. | |
| 2008/0070549 A1 | 3/2008 | Wang | |
| 2008/0090614 A1 | 4/2008 | Sicher et al. | |

FOREIGN PATENT DOCUMENTS

| | | |
|---|---|---|
| EP | 1146759 A2 | 10/2001 |
| EP | 1276339 A1 | 1/2003 |
| EP | 1679925 A1 | 7/2006 |
| EP | 1748661 A1 | 1/2007 |
| EP | 2079256 A1 | 7/2009 |
| GB | 2324004 A | 10/1998 |
| GB | 2428544 A | 1/2007 |
| WO | WO9742783 A2 | 11/1997 |
| WO | WO01015414 A1 | 3/2001 |
| WO | WO02058361 A2 | 7/2002 |
| WO | WO03041443 A1 | 5/2003 |
| WO | WO-03096723 A1 * | 11/2003 ......... G06Q 20/3552 |
| WO | WO2004057485 A1 | 7/2004 |
| WO | WO2004082310 A1 | 9/2004 |
| WO | WO2004105421 A2 | 12/2004 |
| WO | WO2006054980 A1 | 5/2006 |
| WO | WO2006084183 A1 | 8/2006 |
| WO | WO2007079425 A2 | 7/2007 |
| WO | WO2008086255 A2 | 7/2008 |
| WO | WO2009002649 A2 | 12/2008 |
| WO | WO2009032853 A1 | 3/2009 |

OTHER PUBLICATIONS

European Patent Application No. 08250050.5—Summons to attend oral proceedings dated Apr. 11, 2014.
International Search Report and Written Opinion dated Nov. 17, 2008 for International Application No. PCT/US2008/009009.
International Search Report and Written Opinion dated Nov. 18, 2008 for International Application No. PCT/US2008/009007.
International Search Report and Written Opinion dated Feb. 6, 2009 for International Application No. PCT/US2008/075138.
International Search Report and Written Opinion dated May 27, 2009 for International Application No. PCT/US2009/031016.
Search Report dated May 27, 2009 for European Application No. 09000426.8.
International Search Report and Written Opinion dated Jan. 20, 2009 for International Application No. PCT/US2008/064971.
Invitation to Pay Fees and Partial International Search Report dated Oct. 22, 2008 for International Application No. PCT/US2008/064971.
International Search Report and Written Opinion dated Jan. 5, 2009 for International Application No. PCT/US2008/050343.
International Preliminary Report on Patentability dated Jul. 7, 2009 for International Application No. PCT/US2008050343.
International Search Report and Written Opinion dated Apr. 24, 2008 for International Application No. PCT/US2008/050340.
European Search Report dated Apr. 24, 2008 for European Application No. EP 08250053.

(56) References Cited

OTHER PUBLICATIONS

International Preliminary Report on Patentability dated Jul. 16, 2009 for PCT/US2008/050340.
International Preliminary Report dated Jul. 16, 2009 for PCT/US2008/050343.
Office Action dated Apr. 3, 2009 for European Application No. 08250050.5.
International Search Report and Written Opinion dated Jan. 15, 2009 for International Application No. PCT/US2008/050343.
Communication Relating to the Results of the Partial International Search Report dated Oct. 31, 2008 for PCT/US2008/050343.
European Search Report dated May 19, 2008 for EP 08250050.50.
European Extended Search Report dated Aug. 4, 2008 for EP 08250050.5.

* cited by examiner

MOBILE DEVICE ACTIVATION

CROSS-REFERENCE TO RELATED APPLICATION(S)

This application is a continuation of U.S. application Ser. No. 11/650,859, filed Jan. 7, 2007, and entitled, "MOBILE DEVICE ACTIVATION," which is herein incorporated by reference in its entirety. This application is also related to U.S. Provisional Patent Application No. 60/879,318, filed Jan. 7, 2007, and entitled "METHOD, SYSTEM AND GRAPHICAL USER INTERFACE FOR MOBILE DEVICE ACTIVATION," which is herein incorporated by reference in its entirety.

FIELD

The present invention relates to portable electronic devices and, more particularly, to activation of portable electronic devices having wireless communication capabilities.

BACKGROUND

Mobile phones are often used by individuals on a personal basis. When a mobile phone is newly acquired, the wireless network infrastructure (e.g., cellular phone network) of the appropriate wireless carrier or service provider needs to be setup to work with the mobile phone. Mobile phone setup is principally done at retail establishments that sell mobile phones and wireless service plans. Alternatively, mobile phones can be configured at a manufacturing or distribution site or at a service center. Unfortunately, however, mobile phone setup is time consuming and restrictive to consumers. Additionally, once a mobile phone and service plan have been setup for a consumer, the wireless network needs to be informed of the mobile phone and the mobile phone thereafter needs to register with the wireless network whenever being used. Registration requires a location update request be sent from the mobile phone to the wireless network. In the case of initial phone setup, since location update is triggered on power-up, typically the person configuring the mobile phone would be required to power-off and then power-on the mobile phone to render it active on the wireless network. There is thus a need to avoid the various inconveniences and inefficiencies of conventional mobile phone setup.

SUMMARY

The invention pertains to methods and apparatus for activation of mobile devices, such as communication devices or multi-function devices, via a personal computer. According to one aspect of the invention, a mobile device can be forced into a limited service mode until properly activated with a service provider for a wireless network. According to another aspect of the invention, a mobile device can defer its attempt to send a location update request to a wireless network. According to still another aspect of the invention, a mobile device can be automatically controlled to reset a portion of its internal hardware to initiate a location update request.

The invention can be implemented in numerous ways, including as a method, system, device, apparatus (including graphical user interface), or computer readable medium. Several embodiments of the invention are discussed below.

As a method for enabling a mobile communication device, one embodiment of the invention includes at least the acts of: powering up the mobile device; determining whether the mobile device has been activated; and subsequently initiating a location update request to register the mobile device once it is determined that the mobile device has been activated.

As a method for enabling a mobile multi-function device, one embodiment of the invention includes at least the acts of: powering up the mobile multi-function device; determining whether the mobile multi-function device has been activated; and placing the mobile multi-function device in a limited service mode if it is determined that the mobile multi-function device has not been activated.

As a method for enabling a mobile multi-function device, one embodiment of the invention includes at least the acts of: powering up the mobile multi-function device in a restricted operation condition; receiving an indication that the mobile multi-function device has been activated; and subsequently enabling the mobile multi-function device for multi-functional operation.

As a computer readable medium including at least computer program code for enabling a mobile device having at least wireless voice communication capabilities, one embodiment of the invention includes at least: computer program code for powering up the mobile device; computer program code for determining whether the mobile device has been enabled; and computer program code for subsequently initiating a network registration request to register the mobile device with a wireless network once it is determined that the mobile device has been enabled.

As a mobile device, one embodiment of the invention includes at least: a memory for non-volatile storage of data, where the stored data includes at least a stored indication of whether or not said mobile device is enabled for use; a wireless transceiver capable of wireless transmission of data and wireless reception of data over a wireless network; and a processor for controlling operation of said mobile device, said processor operating said mobile device in a limited use mode or a normal use mode depending on the stored indication stored in said memory.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION

The invention pertains to methods and apparatus for activation of mobile devices, such as communication devices or multi-function devices, via a personal computer. According to one aspect of the invention, a mobile device can be forced into a limited service mode until properly activated with a service provider for a wireless network. According to another aspect of the invention, a mobile device can defer its attempt to send a location update request to a wireless network. According to still another aspect of the invention, a mobile device can be automatically controlled to reset a portion of its internal hardware to initiate a location update request.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
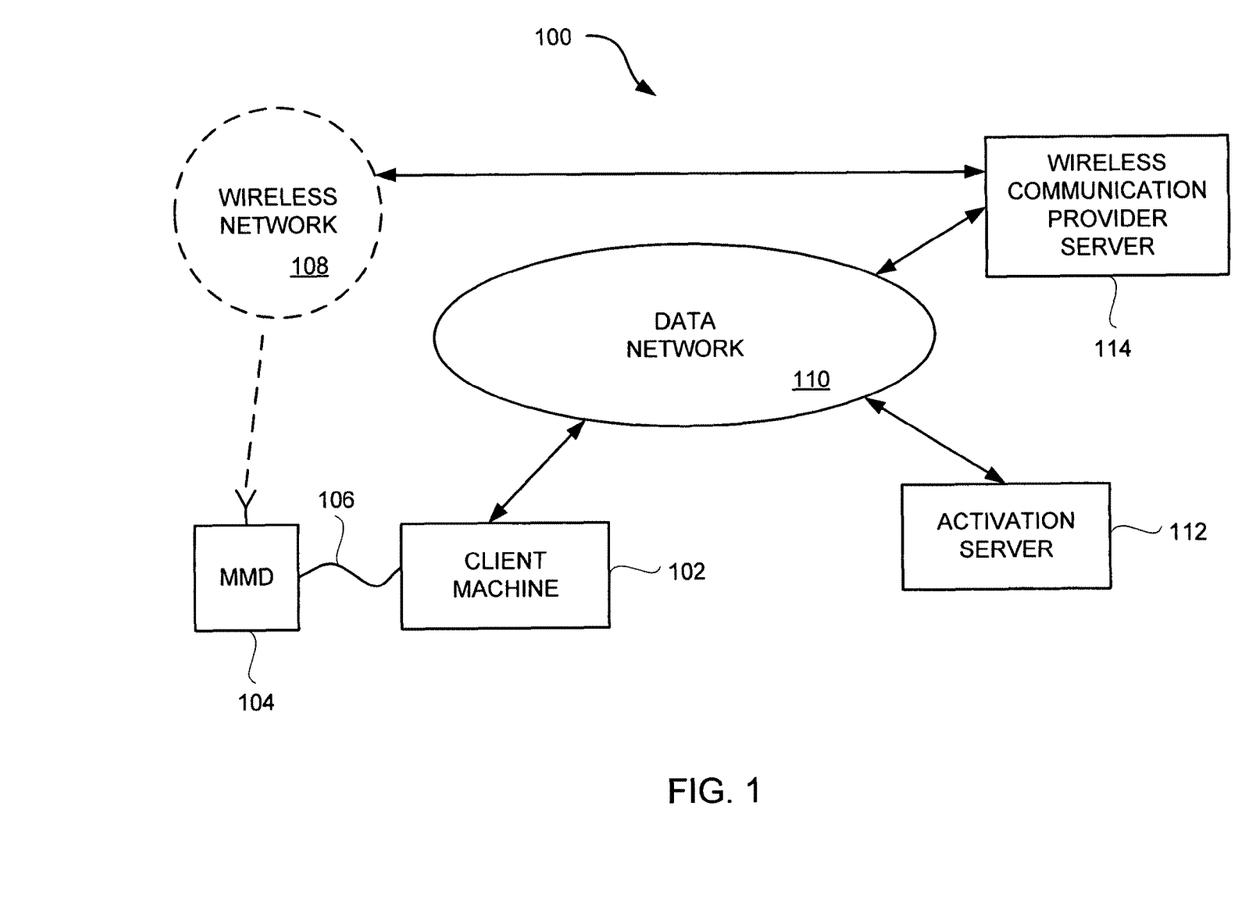
FIG. 1 is a block diagram of an activation system according to one embodiment of the invention.

FIG. 1 is a block diagram of an activation system 100 according to one embodiment of the invention. The activation system 100 includes a client machine 102. The client machine 102 is, for example, a computing device, such as a personal computer. The client machine 102 can also be referred to as a host device. A mobile multi-function device 104 can be connected (e.g., temporarily connected) to the client machine 102. In one implementation, the mobile multi-function device 104 can be connected to the client machine 102 over a cable 106. As an example, the cable 106 can pertain to a peripheral bus (e.g., USB) connection. In another implementation, the mobile multi-function device 104 can connect to the client machine 102 over a wireless connection. The mobile multi-function device 104 operates to support a plurality of different functions. For example, the mobile multi-function device 104 can operate as a media playback device, such as an MP3 player, video player, game player, etc. In addition, the mobile multi-function device 104 can support wireless voice communications through a wireless network 108. The wireless voice communications through the wireless network 108 can communicate with other mobile multi-function devices or other communication devices. Although FIG. 1 illustrates one client machine 102 and one mobile multi-function device 104, it should be noted that the activation system 100 can have multiple client machines 102 and multiple mobile multi-function devices 104. In addition, one or more of the mobile multi-function devices can connect to one or more client machines. In one implementation, the wireless network 108 can represent a cellular telephone network. In another implementation, the wireless network 108 can represent a local or regional wireless network (e.g., WiFi, WiMax). In still another implementation, the wireless network 108 can represent multiple wireless networks.

The activation system 100 also illustrates a data network 110. The data network is, for example, a local area network, a wide area network or a global network, such as the Internet. The client machine 102 can couple to the data network 110. In addition, the activation system 100 includes an activation server 112 and a wireless communication provider server 114. In order to activate the mobile multi-function device 104, the mobile multi-function device 104 interacts with the activation server 112. To do so, the mobile multi-function device 104 communicates with the client machine 102 and the client machine 102 in turn communicates with the activation server 112 through the data network 110. In this regard, the activation server 112 can coordinate and control activation of the mobile multi-function device 104. In addition, the activation server 112 can communicate with the wireless communication provider server 114 so that the appropriate account information can be established for the wireless communication provider that is operating on the wireless network 108 to be utilized by the mobile multi-function device 104.

Figure 2:
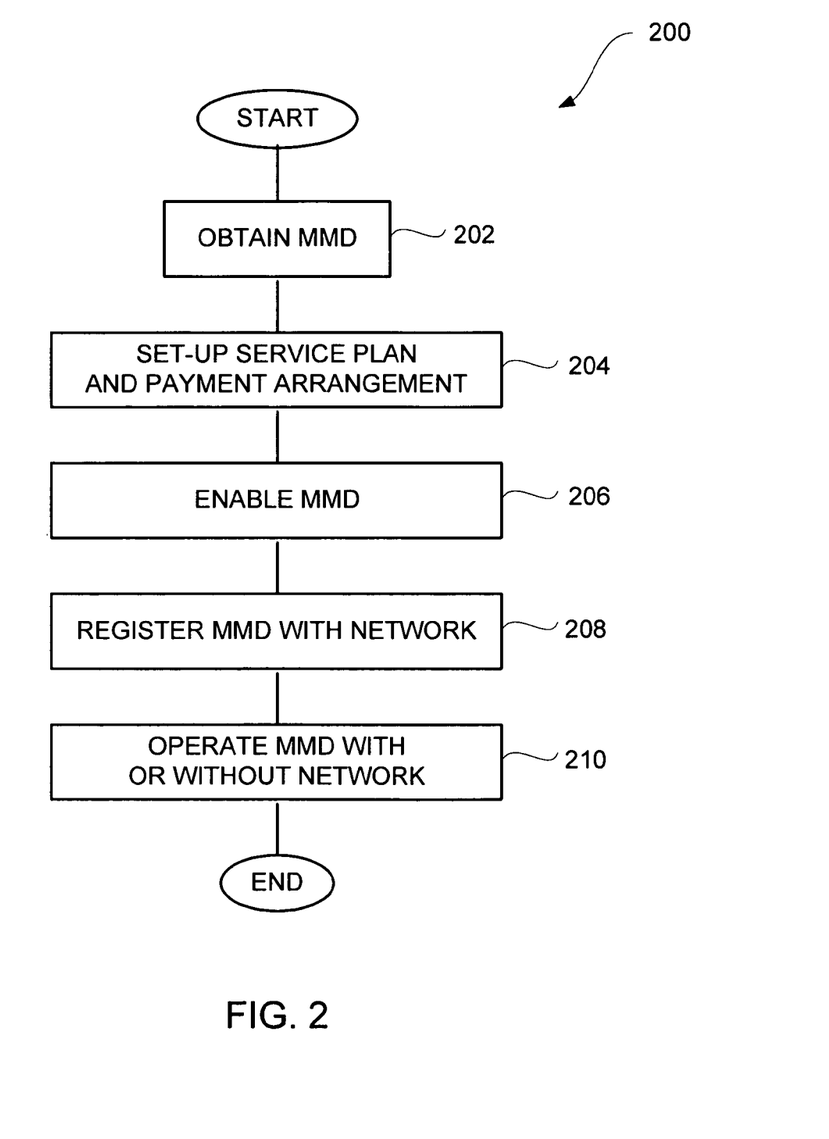
FIG. 2 is a flow diagram of a system activation process according to one embodiment of the invention.

FIG. 2 is a flow diagram of a system activation process 200 according to one embodiment of the invention. The system activation process 200 concerns activation of a mobile multi-function device (MMD). The system activation process 200 begins with a mobile multi-function device being obtained 202. For example, a user can obtain 202 a mobile multi-function device at a retail location or by mail order. In this embodiment, when the mobile multi-function device is obtained 202, it is not activated for use with any wireless network. As a result, the mobile multi-function device needs to go through an activation process in order to operate. In this regard, after the mobile multi-function device is obtained 202, a service plan and payment arrangement needs to be setup 204. After the service plan and payment arrangement have been successfully setup 204, the mobile multi-function device can be enabled 206. In addition, the mobile multi-function device can be registered with a network, namely, a wireless network. Here, the registration 208 with the network is performed to permit the mobile multi-function device to be utilized on the network.

Following successful enabling 206 and registration 208, the mobile multi-function device can operate 210 with or without utilization of the network. In this regard, since the mobile multi-function device supports multiple functions, the mobile multi-function device can be utilized in a non-network manner, such as playing local games, displaying local data, playing music from local storage, viewing local pictures, viewing locally stored electronic mail, etc. However, if the user of the mobile multi-function device desires to utilize the network (e.g., make or received voice calls or electronic messages), network access is permitted in accordance with the service plan that has been set up 204, provided that the registration 208 was successful and provided that the network is available.

Once the mobile multi-function device is enabled 206 some or all of the functions or operations supported by the mobile multi-function device can be utilized. In one embodiment, once enabled at block 206, the mobile multi-function device can be utilized for all non-network functions or operations available from the mobile multi-function device. In another embodiment, functions or operations of the mobile multi-function device can be prevented or restricted until completion of initial (i.e., first time) registration at block 208 at which point all functions or operations available from the mobile multi-function device can be utilized.

Figure 3:
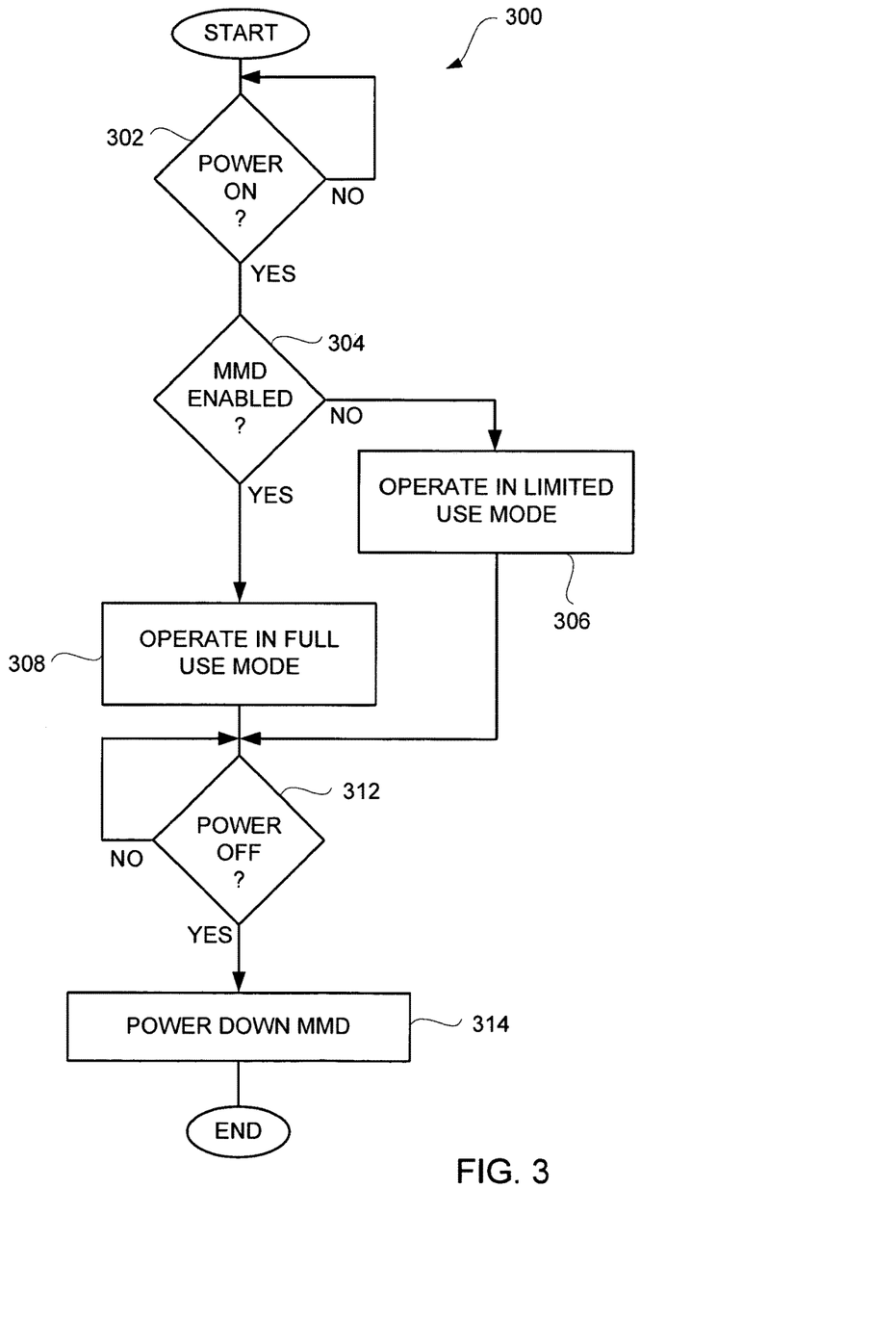
FIG. 3 is a flow diagram of a device operational process according to one embodiment of the invention.

FIG. 3 is a flow diagram of a device operational process 300 according to one embodiment of the invention. The device operational process 300 is, for example, processing associated with a mobile multi-function device, such as the mobile multi-function device 104 illustrated in FIG. 1.

The device operational process 300 can begin when the mobile multi-function device is powered on. Hence, a decision 302 determines whether the mobile multi-function device has been powered on. When the decision 302 determines that the mobile multi-function device has not been powered on, the device operational process 300 can awaits power on. On the other hand, when the decision 302 determines that the mobile multi-function device has been powered on, a decision 304 determines whether the mobile multi-function device has been enabled. Here, it is assumed that the mobile multi-function device performing the device operational process 300 may or may not have been enabled to operate. Hence, when the decision 304 determines that the mobile multi-function device has not been enabled, the mobile multi-function device is eligible to operate 306 in a limited use mode. As an example, in the limited use mode, the mobile multi-function device can permit emergency communications (e.g., emergency telephone calls). However, the limited use mode may prevent other operations of the mobile multi-function device. For example, if the mobile multi-function device provides media playback or network browsing, then when in the limited use mode, media playback and/or network browsing can be prevented. In one implementation, while in the limited use mode, the mobile multi-function device can prevent all other operational uses except emergency communications.

On the other hand, when the decision 304 determines that the mobile multi-function device is enabled, the mobile multi-function device can operate in a full use mode. Following the blocks 306 and 308, a decision 312 can determine whether the mobile multi-function device is to be powered off. When the decision 312 determines that the mobile multi-function device should not be powered off, the mobile multi-function device continues to operate in the previously established operational mode (e.g., limited use mode or full use mode). On the other hand, when the decision 312 determines that the mobile multi-function device should be powered off, the mobile multi-functional device is powered down 314. Following the block 314, the device operational process 300 ends.

Figure 4:
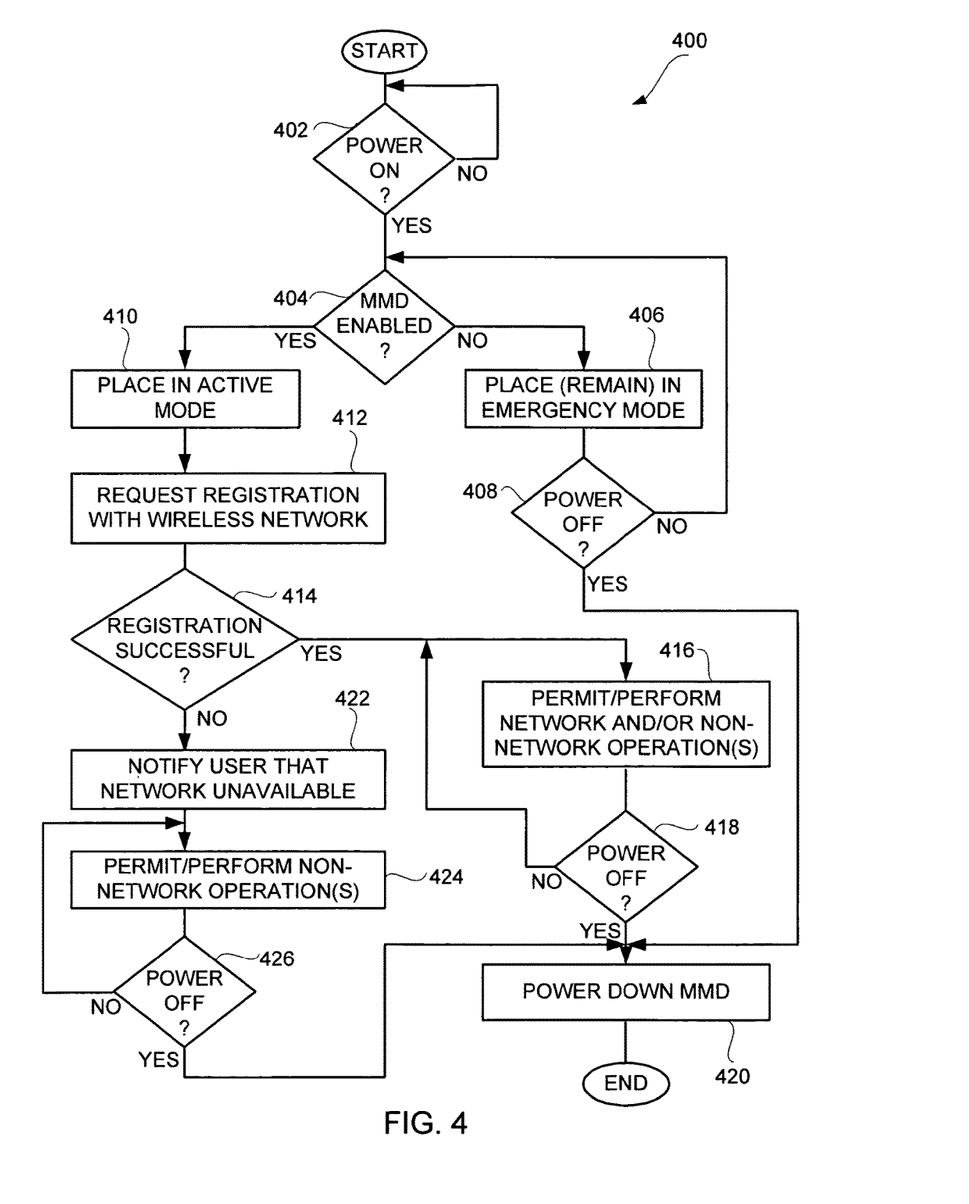
FIG. 4 is a flow diagram of a device operation process according to another embodiment of the invention.

FIG. 4 is a flow diagram of a device operation process 400 according to another embodiment of the invention. The device operational process 400 is, for example, processing associated with a mobile multi-function device, such as the mobile multi-function device 104 illustrated in FIG. 1.

The device operational process 400 begins with a decision 402. The decision 402 determines whether the mobile multi-function device has been powered on. When the decision 402 determines that the mobile multi-function device has not been powered on, the device operational process 400 awaits power on of the mobile multi-function device. Once the decision 402 determines that the mobile multi-function device has been powered on, the device operational process 400 is effectively invoked. Once the decision 402 determines that the mobile multi-function device has been powered on, a decision 404 determines whether the mobile multi-function device has been enabled. When the decision 404 determines that the mobile multi-function device has not yet been enabled, the device operational process 400 places 406 the mobile multi-function device in an emergency mode. In the emergency mode, the mobile multi-function device is permitted to make emergency calls only. Next, a decision 408 determines whether the mobile multi-function device has been powered off. When the decision 408 determines that the mobile multi-function device has not been powered off, the device operational process 400 returns to repeat the decision 404 to again evaluate whether the mobile multi-function device has been enabled.

Alternatively, when the decision 404 determines that the mobile multi-function device has been enabled, the mobile multi-function device is placed 410 in an active mode. Registration with a wireless network can also be requested 412. In one embodiment, a location update request can be used to request 412 registration with the wireless network. A decision 414 determines whether the registration with the wireless network has been successful. When the decision 414 determines that the registration has been successful, the device operational process 400 permits 416 the mobile multi-function device to perform network and/or non-network operations. Next, a decision 418 determines whether the mobile multi-function device has been powered off.

When the decision 418 determines that the mobile multi-function device has not been powered off, the device operational process 400 returns to repeat the block 416 so that the mobile multi-function device can continue to perform 416 network and/or non-network operations.

On the other hand, when the decision 414 determines that registration with the wireless network has not been successful, then the user of the multi-function device can be notified 422 that the network is unavailable. In one implementation, the notification 422 can be display on a display screen for one or both of the multi-function device or a client device connected thereto. Further, the mobile multi-function device can be operated to permit 424 non-network operations. A decision 426 can then determine whether the mobile multi-function device has been powered off. When the decision 426 determines that the mobile multi-function device has not been powered off, the device operational process 400 returns to repeat the block 424 so that non-network operations can continue to be performed 424.

When any of the decision 408, 418 or 426 determine that the mobile multi-function device is to be powered off, the mobile multi-function device can be powered down 420. After the mobile multi-function device has been powered down, the device operational process 400 ends.

Figure 5:
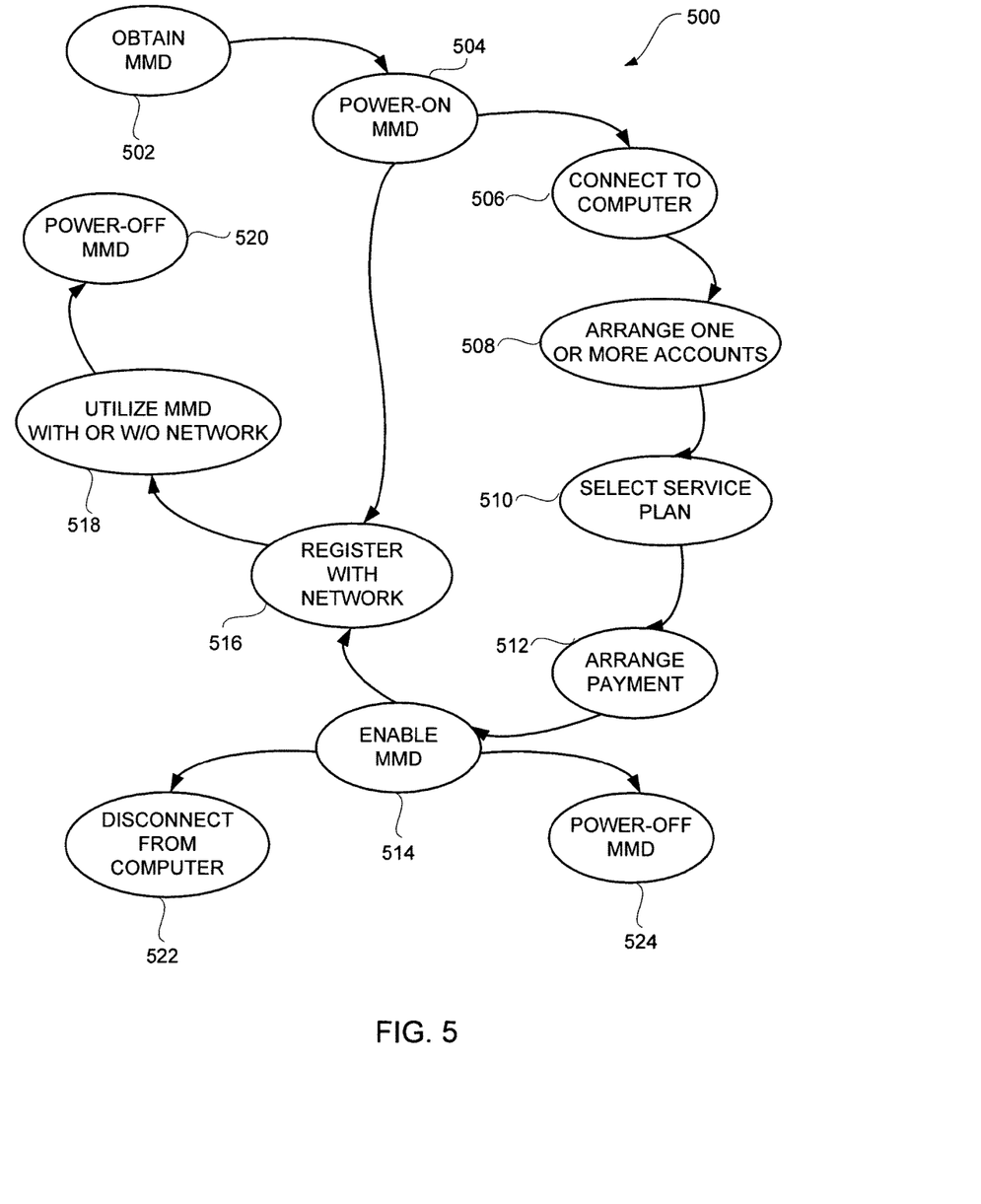
FIG. 5 is a system state diagram according to one embodiment of the invention.

FIG. 5 is a system state diagram 500 according to one embodiment of the invention. The system state diagram 500 illustrates a plurality of states associated with system activation of a mobile multi-function device (MMD) according to one embodiment. At state 502, a mobile multi-function device is obtained. At state 504, following the state 502, the mobile multi-function device is powered-on. Next, at state 506, the mobile multi-function device is connected to a computer, (e.g., personal computer). Thereafter, at state 508, one or more accounts can be arranged. These accounts can pertain to an account with an online media store and/or an account with a wireless service provider. Next, at state 510, a service plan can be selected. Typically, the service plans are associated with a wireless service provider that is providing wireless network access for the mobile multi-function device. In addition, payment can be arranged at state 512. Following state 512, at state 514, the mobile multi-function device can be enabled. Once enabled, the mobile multi-function device is able to be fully utilized. In this regard, the mobile multi-function device can be registered with a network (e.g., wireless network) at state 516. The registration with the network enables the mobile multi-function device to send and receive calls with respect to the network. Optionally, it should be noted that following the state 504, in the event that the mobile multi-function device was previously enabled, the mobile multi-function device can transition directly to state 516. In any case, once the mobile multi-function device has been registered with the network at state 516, the mobile multi-function device can be utilized with the network at state 518. Following the state 518, the mobile multi-function device can be powered off at state 520. Also, following the state 514, the mobile multi-function device can be disconnected from the computer at state 522 or the mobile multi-function device can be powered off at state 524.

Figure 6A:
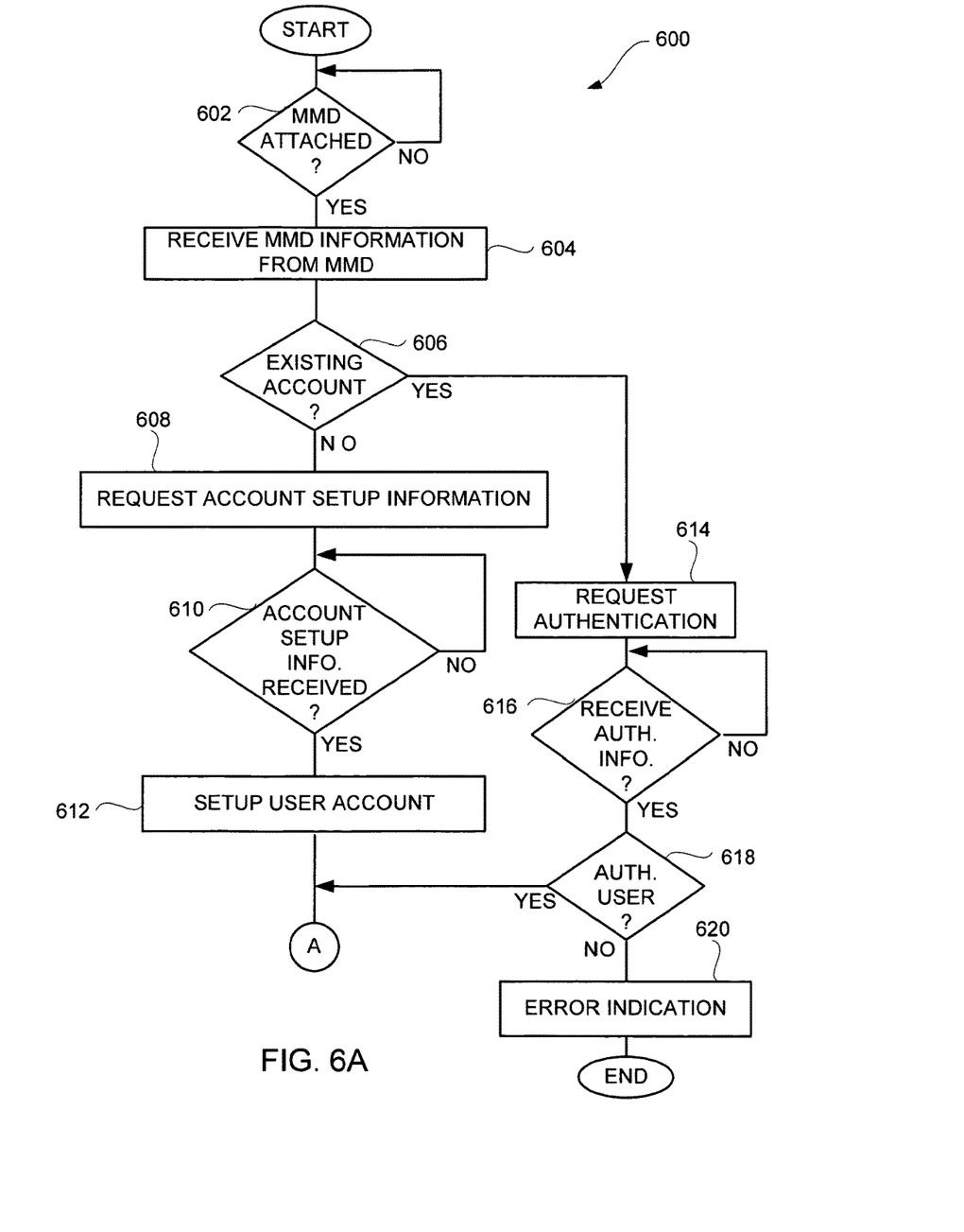
FIGS. 6A-6C are flow diagrams of a network service setup process according to one embodiment of the invention.
Figure 6B:
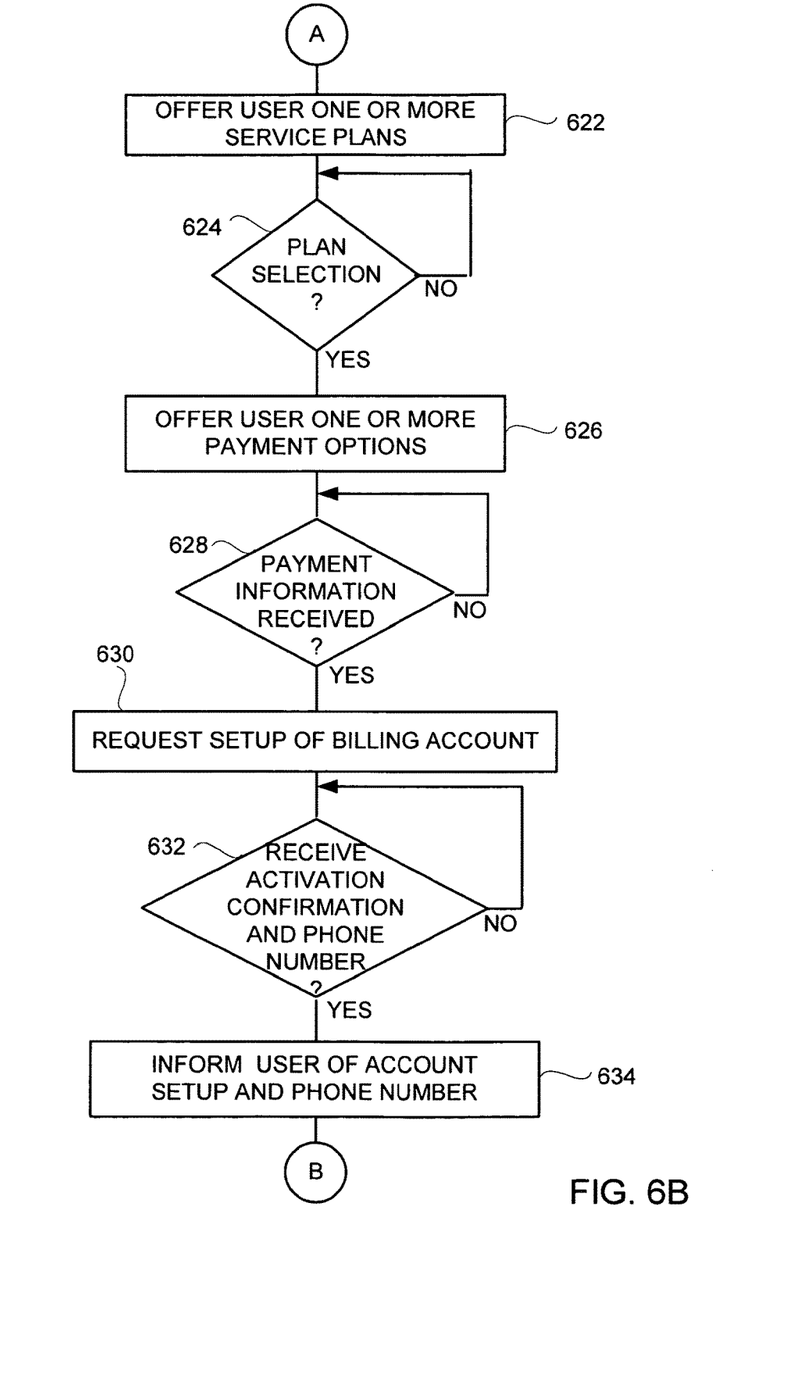
Figure 6C:
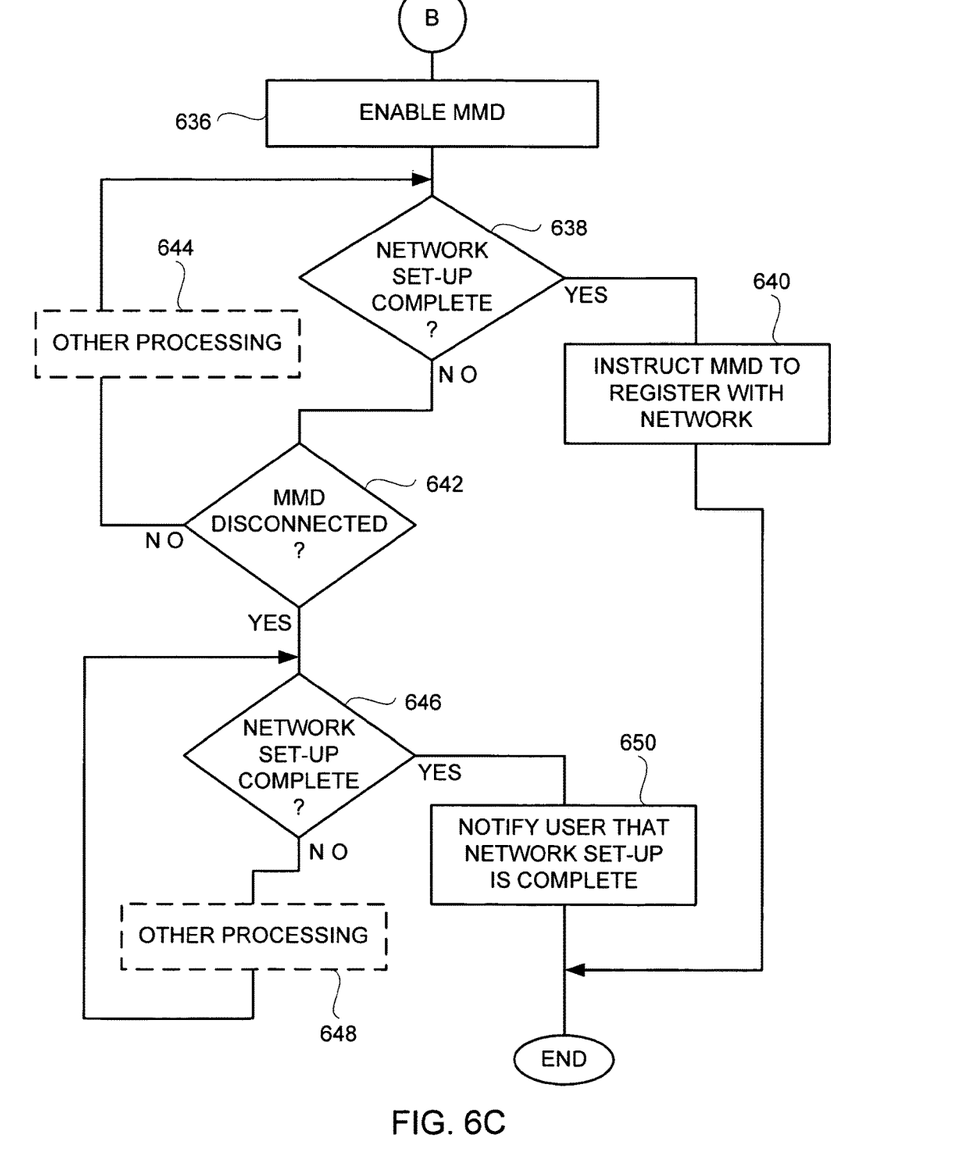

FIGS. 6A-6C are flow diagrams of a network service setup process 600 according to one embodiment of the invention. For example, with reference to FIG. 1, the network service setup process 600 is processing performed when the mobile multi-function device 104 is connected to the client machine 102 illustrated in FIG. 1 so that interaction with the activation server 112 can be performed to setup service for the mobile multi-function device 104.

The network service setup process 600 can begin with a decision 602 that determines whether the mobile multi-function device is attached to the client machine (e.g., personal computer). When the decision 602 determines that the mobile multi-function device is not attached, then the network service setup process 600 is not performed. On the other hand, when the decision 602 determines that the mobile multi-function device is attached, the network service setup process 600 can be performed. In this regard, mobile multi-function device (MMD) information is received 604 from the mobile multi-function device. A decision 606 can then determine whether the mobile multi-function device is subject to an existing account. When the decision 606 determines that the mobile multi-function device is not subject to an existing account, account setup information is requested 608. A decision 610 then determines whether the account setup information has been received. When the decision 610 determines that the account setup information has not yet been received, the network service setup process 600 awaits such information. Once the decision 610 determines that the account setup information has been received, a user account can be setup 612. The user account can pertains to a user account with a wireless service provider, an online media store, and/or some other account. The user account contains information concerning the user and often includes personal information and financial information.

On the other hand, when the decision 606 determines that an existing account is associated with the mobile multi-function device, authentication can be requested 614. A decision 616 can then determine whether the authentication information has been received. When the decision 616 determines that the authentication information has not yet been received, the network service setup process 600 can await such information. Alternatively, when the decision 616 determines that the authentication information has been received, a decision 618 can determine whether the user is authenticated for access to the existing account. When the decision 618 determines that the user has not been authenticated, an error indication 620 can be provided. Following the block 620, the network service setup process 600 ends with network setup not being completed.

Following the block 612 or following the decisions 618 when the user has been properly authenticated, the user can be offered 622 one or more service plans. A decision 624 then determines whether a plan has been selected. When the decision 624 determines that a plan has not yet been selected, the network service setup process 600 awaits such a selection. Once the decision 624 determines that a plan has been selected, the user can be offered 626 one or more payment options. Next, a decision 628 determines whether payment information has been received. When the decision 628 determines that payment information has not yet been received, the network service setup process 600 can await receipt of the payment information. Once the decision 628 determines that the payment information has been received, setup of a billing account can be requested 630.

Next, a decision 632 can determine whether activation confirmation and phone number for the account being established have been received. When the activation confirmation and phone number have not been received, the network service setup process 600 can await such information. Alternatively, when the decision 632 determines that the activation confirmation and phone number have been received, the user can be informed 634 of successful account setup and the appropriate phone number. Following the block 634, the mobile multi-function device is enabled 636. In one implementation, the client machine 102 can write certain information into data storage on the mobile multi-function device 104 to inform the mobile multi-function device 104 that the device is now enabled. The mobile multi-function device can then self-determine whether the device is enabled by reading the stored information. In any case, following the block 636, a decision 638 determines whether network setup has been completed. When the decision 638 determines that network setup has been completed, the mobile multi-function device can be instructed 640 to register with the network. The mobile multi-function device can be instructed 640 to register with the network by causing a location update to be issued from the mobile multi-function device. In one implementation, the client machine 102 can send a command to the mobile multi-function device 104 to initiate the location update. In another implementation, the client machine 102 can cause the mobile multi-function device 104 to reset its radio transmitter/receiver (i.e., a portion of its hardware) so as to trigger a location update.

On the other hand, when the decision 638 determines that the network setup is not complete, a decision 642 determines whether the mobile multi-function device has been disconnected from the client machine. When the decision 642 determines that the mobile multi-function device has not been disconnected, the network service setup process 600 can perform other processing 644 unassociated with the network setup. For example, the other processing 644 can pertain to the synchronization of data between the client machine 102 and the mobile multi-function device 104. The other processing can also pertain to media playback at the mobile multi-function device, setting of preferences at the mobile multi-function device or at the client machine. Following the block 644, the network service setup process 600 returns to repeat the decision 638 to again determine whether network setup has completed.

Alternatively, when the decision 642 determines that the mobile multi-function device has been disconnected from the client machine, a decision 646 determines whether network setup has completed. When the decision 646 determines that network setup has not completed, other processing 648 can be performed until the network setup has completed. Alternatively, when the decision 646 determines that network setup has completed, the user can be notified 650 that network setup has completed. The notification can alert the user to perform an action with respect to the mobile multi-function device so that the mobile multi-function device can register with the network and thereafter be utilized thereon. As an example, the notification can be provided to the user by displaying an indication or by sending an electronic message (e.g., email or text message) to the associated client machine. For example, the user can be instructed by the notification to power cycle the mobile multi-function device or connect the mobile multi-function device to the client machine. Following the blocks 640 and 650, the network service setup process 600 ends.

In one embodiment, a method for enabling the mobile multi-function device includes: i) powering up the mobile multi-function device, ii) determining whether the mobile multi-function device has been activated, and iii) placing the mobile multi-function device in a limited service mode if the mobile multi-function device has not been activated. In some embodiments, activation of the mobile multi-function device pertains to activation with respect to a wireless network service provider. In some embodiments, determining whether the mobile multi-function device has been activated is based on data stored on the mobile multi-function device after the mobile multi-function device has been activated. In some embodiments, the mobile multi-function device includes a memory device and a SIM card having an accessible SIM card identifier, and the data stored on the mobile multi-function device includes an activation identifier stored in the memory device. In some embodiments, determining whether the mobile multi-function device has been activated includes determining whether the activation identifier retrieved from the memory device of the mobile multifunction device matches the SIM card identifier read from the SIM card being used with the mobile multi-function device. In some embodiments, the method for enabling the mobile multi-function device includes placing the mobile multi-function device in a full service when the mobile multi-function device has been activated. In some embodiments, placing the mobile multi-function device in the full service mode includes the mobile multi-function device being capable of media playback operation and capable of wireless voice communication operations carried by a wireless cellular network. In some embodiments, the method includes requesting registration with a wireless network only when the mobile multifunction device is placed in a full service mode. In some embodiments, requesting registration includes sending a location update request to a wireless cellular network. In some embodiments, the method includes receiving data from a personal computing device when the mobile multifunction device has been activated; and storing the data in the mobile multi-function device. In some embodiments, receiving data from a personal computing device includes receiving the data over a wired peripheral bus connection between the mobile multi-function device and the personal computing device.

Further information on network service setup is contained in U.S. Provisional Patent Application No. 60/879,318, filed Jan. 7, 2007, and entitled "METHOD, SYSTEM AND GRAPHICAL USER INTERFACE FOR MOBILE DEVICE ACTIVATION," which is hereby incorporated by reference herein.

Figure 7:
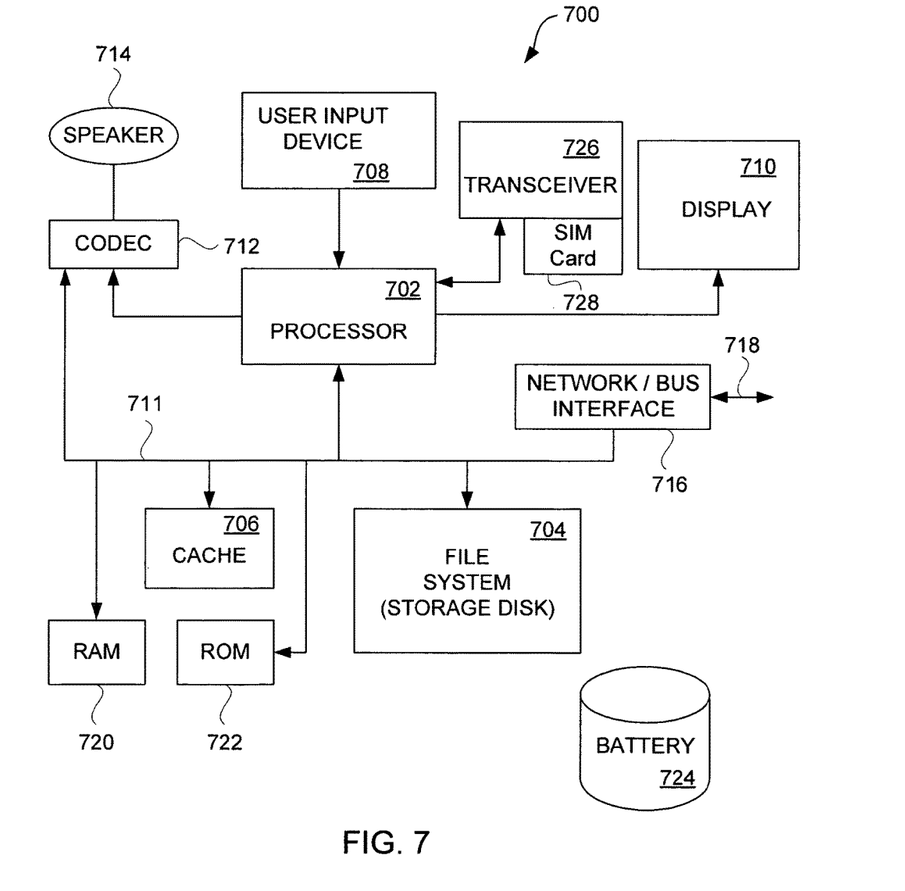
FIG. 7 is a block diagram of a mobile multi-function device according to one embodiment of the invention.

FIG. 7 is a block diagram of a mobile multi-function device 700 according to one embodiment of the invention. The mobile multi-function device 700 can include the circuitry of the mobile multi-function device 104 illustrated in FIG. 1 and/or can perform the operations described with reference to FIGS. 3 and 4. The mobile multi-function device 700 includes hardware and software components to provide at least two functions, namely, a media playback function and a wireless voice communications function. When providing media playback, the mobile multi-function device 700 can operate as a media player capable of playing (including displaying) media items. The media items can, for example, pertain to audio items (e.g., audio files or songs), videos (e.g., movies) or images (e.g., photos). When providing wireless voice communications, the mobile multi-function device 700 can operates a mobile telephone (e.g., cellular phone).

The mobile multi-function device 700 includes a processor 702 that pertains to a microprocessor or controller for controlling the overall operation of the mobile multi-function device 700. The mobile multi-function device 700 stores media data pertaining to media items in a file system 704 and a cache 706. In one embodiment, the file system 704 is implemented by a storage disk or a plurality of disks. In another embodiment, the file system 704 is implemented by EEPROM or Flash type memory. The file system 704 typically provides high capacity storage capability for the mobile multi-function device 700. However, since the access time to the file system 704 is relatively slow, the mobile multi-function device 700 can also include a cache 706. The cache 706 is, for example, Random-Access Memory (RAM) provided by semiconductor memory. The relative access time to the cache 706 is substantially shorter than for the file system 704. However, the cache 706 does not have the large storage capacity of the file system 704. Further, the file system 704, when active, consumes more power than does the cache 706. The power consumption is often a concern when the mobile multi-function device 700 is a portable mobile multi-function device that is powered by a battery (not shown). The mobile multi-function device 700 also includes a RAM 720 and a Read-Only Memory (ROM) 722. The ROM 722 can store programs, utilities or processes to be executed in a non-volatile manner. The ROM 722 can be implemented by an EEPROM or Flash type memory so as to provide writable non-volatile data storage. The RAM 720 provides volatile data storage, such as for the cache 706.

To support wireless voice communications, the mobile multi-function device 700 includes a transceiver 726 and a SIM card 728. The transceiver 726 supports wireless communication with a wireless network (such as a wireless cellular network). The SIM card 728 includes an identifier (e.g., SIM identifier) can be used by the mobile multi-function device 700 to gain access and utilize the wireless network. In other embodiments, a SIM card 728 is not utilized.

The mobile multi-function device 700 also includes a user input device 708 that allows a user of the mobile multi-function device 700 to interact with the mobile multi-function device 700. For example, the user input device 708 can take a variety of forms, such as a button, keypad, dial, etc. Still further, the mobile multi-function device 700 includes a display 710 (screen display) that can be controlled by the processor 702 to display information to the user. A data bus 711 can facilitate data transfer between at least the file system 704, the cache 706, the processor 702, and the CODEC 712.

In one embodiment, the mobile multi-function device 700 serves to store a plurality of media items (e.g., songs) in the file system 704. When a user desires to have the mobile multi-function device play a particular media item, a list of available media items is displayed on the display 710. Then, using the user input device 708, a user can select one of the available media items. The processor 702, upon receiving a selection of a particular media item, supplies the media data (e.g., audio file) for the particular media item to a coder/decoder (CODEC) 712. The CODEC 712 then produces analog output signals for a speaker 714. The speaker 714 can be a speaker internal to the mobile multi-function device 700 or external to the mobile multi-function device 700. For example, headphones or earphones that connect to the mobile multi-function device 700 would be considered an external speaker.

The mobile multi-function device 700 also includes a bus interface 716 that couples to a data link 718. The data link 718 allows the mobile multi-function device 700 to couple to a host device (e.g., host computer or power source). The data link 718 can also provide power to the mobile multi-function device 700.

The various aspects, embodiments, implementations or features of the invention can be used separately or in any combination.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that mobile devices can be setup or activated to operate on wireless networks by end users. Another advantage of the invention is that setup or activation can be substantially automated and controlled by a computer-implemented system to facilitate setup or activation with a service provider (e.g., wireless service provider). Another advantage of the invention is that mobile devices can be largely disabled until properly activated with a service provider. Still another advantage of the invention is that initial registration of a mobile device with a wireless network does not require a powering off and then powering on of power.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed:

1. A method comprising:
at a mobile device:
receiving an activation identifier, wherein: i) the activation identifier is based on a first subscriber identity module (SIM) card included in the mobile device, ii) the activation identifier is received after a service plan is selected, and iii) the first SIM card is associated with a first SIM identifier;
storing the activation identifier in a device memory store, wherein: the device memory store comprises a secure data store, and a digital certificate is associated with a storage of the activation identifier in the secure data store;
reading a second SIM identifier from a second SIM card being used in the mobile device at a second time, wherein the second SIM identifier comprises an integrated circuit card identifier (ICCID) of the second SIM card;
comparing the activation identifier and the second SIM identifier to determine whether they match in order to enable the mobile device to self-determine whether it has been activated and in order to prevent use of a SIM card different from the first SIM card;
when the activation identifier and the second SIM identifier do not match:
preventing use of the second SIM card to access a wireless network; and
when the activation identifier and the second SIM identifier match:
placing the mobile device in a full service mode with ability to access the wireless network.

2. The method of claim 1, further comprising notifying a user of the mobile device that a network setup for the mobile device is complete.

3. The method of claim 2, wherein notifying the user further comprises sending a message to the user with an instruction to power cycle the mobile device to register the mobile device with the wireless network.

4. The method of claim 1, wherein the first SIM identifier is received after payment for the service plan has been arranged with the wireless network.

5. The method of claim 1, further comprising:
communicatively coupling the mobile device to an external computer; and
receiving the activation identifier via the external computer after the service plan is selected for the mobile device.

6. The method of claim 5, wherein the service plan is selected for the mobile device using an interface of the external computer.

7. The method of claim 1, further comprising:
initiating a location update request, wherein the location update request comprises resetting or cycling power to a portion of hardware within the mobile device, and wherein registering the mobile device with the wireless network is caused by the resetting or cycling power.

8. The method of claim 1, wherein a limited service mode is an operational mode of the mobile device, which enables the mobile device to perform emergency calls and prevents the mobile device from performing other calling operations.

9. A mobile device, comprising:
a radio transceiver configurable to communicate via a wireless network;
one or more processors; and
a storage device storing executable instructions that, when executed by the one or more processors, cause the mobile device to perform operations comprising:
receiving an activation identifier, wherein: i) the activation identifier is based on a first subscriber identity module (SIM) card included in the mobile device, ii) the activation identifier is received after a service plan is selected, and iii) the first SIM card is associated with a first SIM identifier,
storing the activation identifier in a device memory store, wherein: the device memory store comprises a secure data store, and a digital certificate is associated with a storage of the activation identifier in the secure data store,
reading a second SIM identifier from a second SIM card being used in the mobile device at a second time, wherein the second SIM identifier comprises an integrated circuit card identifier (ICCID) of the second SIM card,
comparing the activation identifier and the second SIM identifier to determine whether they match in order to enable the mobile device to self-determine whether it has been activated and in order to prevent use of a SIM card different from the first SIM card,
when the activation identifier and the second SIM identifier do not match:
preventing use of the second SIM card to access a wireless network, and when the activation identifier and the second SIM identifier match:
placing the mobile device in a full service mode with ability to access the wireless network.

10. The mobile device of claim 9, wherein a limited service mode is an operational mode that enables the mobile device to perform emergency calls and prevents the mobile device from performing other calling operations.

11. The mobile device of claim 9, wherein:
the mobile device is communicatively coupled to an external computer; and execution of the executable instructions further cause the mobile device to perform an operation of receiving the activation identifier via the external computer after the service plan is selected for the mobile device.

12. The mobile device of claim 11, wherein:
the service plan is selected for the mobile device using an interface of the external computer; and
payment for the service plan is selected using the interface.

13. The mobile device of claim 9, wherein the first SIM identifier is received after payment for the service plan has been arranged with the wireless network.

14. The mobile device of claim 9, wherein the operations performed by the mobile device further comprise:
communicatively coupling the mobile device to an external computer; and
receiving the activation identifier via the external computer after the service plan is selected for the mobile device.

15. The mobile device of claim 9, wherein the operations performed by the mobile device further comprise:
initiating a location update request, wherein the location update request comprises resetting or cycling power to a portion of hardware within the mobile device, and wherein registering the mobile device with the wireless network is caused by the resetting or cycling power.

16. A non-transitory computer readable medium storing executable instructions that, when executed by one or more processors of a mobile device, cause the mobile device to perform operations comprising:
receiving an activation identifier, wherein: i) the activation identifier is based on a first subscriber identity module (SIM) card included in the mobile device, ii) the activation identifier is received after a service plan is selected, and iii) the first SIM card is associated with a first SIM identifier;
storing the activation identifier in a device memory store, wherein: the device memory store comprises a secure data store, and a digital certificate is associated with a storage of the activation identifier in the secure data store;
reading a second SIM identifier from a second SIM card being used in the mobile device at a second time, wherein the second SIM identifier comprises an integrated circuit card identifier (ICCID) of the second SIM card;
comparing the activation identifier and the second SIM identifier to determine whether they match in order to enable the mobile device to self-determine whether it has been activated and in order to prevent use of a SIM card different from the first SIM card;
when the activation identifier and the second SIM identifier do not match:
preventing use of the second SIM card to access a wireless network; and
when the activation identifier and the second SIM identifier match:
placing the mobile device in a full service mode with ability to access the wireless network.

17. The non-transitory computer readable medium of claim 16, wherein preventing use of the second SIM card comprises determining the mobile device to be in a limited service mode that only enables the mobile device to perform emergency calls.

18. The non-transitory computer readable medium of claim 16, wherein the first SIM identifier is received after payment for the service plan has been arranged with the wireless network.

19. The non-transitory computer readable medium of claim 16, wherein the operations performed by the mobile device further comprise:
communicatively coupling the mobile device to an external computer; and
receiving the activation identifier via the external computer after the service plan is selected for the mobile device.

20. The non-transitory computer readable medium of claim 16, wherein the operations performed by the mobile device further comprise:
initiating a location update request, wherein the location update request comprises resetting or cycling power to a portion of hardware within the mobile device, and wherein registering the mobile device with the wireless network is caused by the resetting or cycling power.

* * * * *